(No Model.)
M. S. CONLY.
METHOD OF PRODUCING ALTERNATING ELECTRIC CURRENTS.
No. 428,042. Patented May 13, 1890.
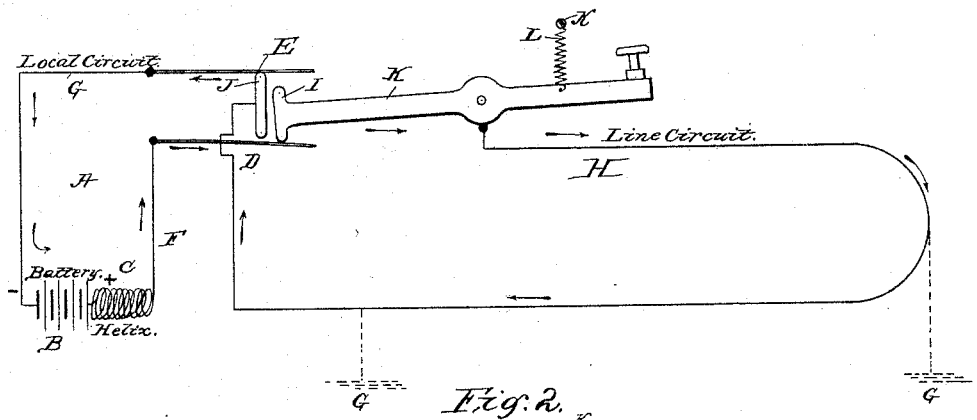
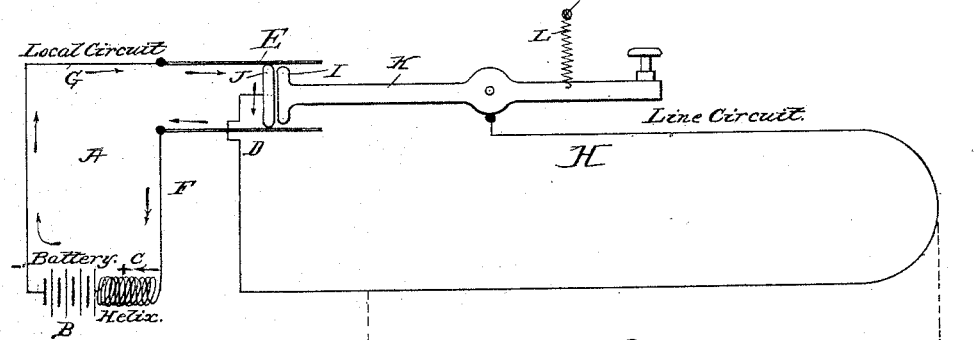
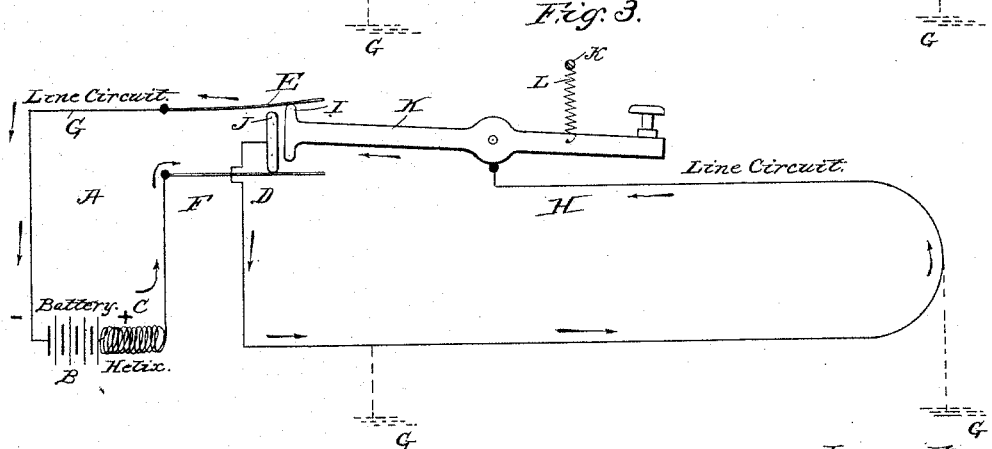
Witnesses.
Inventor:
Mahlon S. Conly
By Jno. G. Elliott
Atty.

UNITED STATES PATENT OFFICE.

MAHLON S. CONLY, OF HYDE PARK, ASSIGNOR OF TWO-THIRDS TO WILLIAM B. STERRETT, OF CHICAGO, AND JOHN F. WEARE, OF HYDE PARK, ILLINOIS.

METHOD OF PRODUCING ALTERNATING ELECTRIC CURRENTS.

SPECIFICATION forming part of Letters Patent No. 428,042, dated May 13, 1890.

Application filed July 9, 1889. Serial No. 316,955. (No model.)

*To all whom it may concern:*

Be it known that I, MAHLON S. CONLY, a citizen of the United States, and a resident of Hyde Park, in the county of Cook and State of Illinois, have invented certain new and useful Improvements in the Method of Producing Alternating Electric Currents, of which the following is a specification.

This invention relates to improvements in the method of producing alternating electric currents in which the terminals of the battery are reversed in relation to the terminals of the line-circuit in which the alternations are to take effect.

The method which heretofore obtained is objectionable, because the alternating current is produced solely by the change of direction of the flow of the primary current from the battery through the line-circuit beyond the local circuit, which in effect is merely the carrying to a greater distance of the primary current of the local circuit, to accomplish which a large number of cells must necessarily be employed, in order to gain sufficient electro-motive force to overcome the resistance of the line, besides which in all such arrangements the electrostatic effects, commonly known as the "kick" of the telegraph-key, occur at each reversal of the terminals by induction, causing retardation in the alternations, which effects are well known to be highly detrimental, and various means have been adopted to destroy them.

The prime object of this invention is to produce and develop to the utmost degree this heretofore useless and detrimental force, whereby a very feeble battery may produce impulses of a high electro-motive force capable of traversing a long line of high resistance and accomplishing effective work in that line not possible to accomplish with alternating currents as heretofore produced, nor directly by the battery by which these impulses are produced.

Another object is to utilize the static discharge of the local circuit solely as the alternating currents or impulses for operating the apparatus contained in the line-circuit to the exclusion of the primary current from the battery heretofore employed in alternating electric currents. The object sought by this method is primarily to cause electrostatic discharges produced by opening a short local circuit to traverse the line-circuit in high-tension impulses, and, secondarily, to cause such impulses to travel in alternately opposite directions, so as to operate devices or apparatus included in the line-circuit and adapted to be operated by the alternating current. This method may be carried out by numerous forms of apparatus, and the alternating currents may be employed for accomplishing various results and working apparatus not necessary to be herein shown or described.

In the drawings I have illustrated in diagram the simplest means known to me for carrying out my method of producing alternating currents, in which—

Figure 1 represents the local and line circuits connected in such manner as to cause the statically-discharged current from the local circuit to traverse the line-circuit in one direction, (indicated by the arrows therein;) Fig. 2, a similar view showing the line-circuit cut out and the local circuit short-circuited, the arrows therein indicating the direction in which the circuit is traversed by the local primary current; and Fig. 3, a similar view showing the line-circuit again cut in, so as to cause the statically-discharged current from the local circuit to traverse the line in the opposite direction from that shown in Fig. 1.

The apparatus illustrated in the drawings may be briefly described as follows, like letters of reference in the several figures referring to the same parts:

Let A represent a very short local circuit of low resistance, including a battery B, a helix C, and flat spring terminals D E, the terminal D being connected with the helix, preferably on the plus side of the battery, by means of a short wire F, and the terminal E directly with the minus side of the battery by means of the wire G, the different parts being so produced and arranged as to secure the maximum degree of electrostatic self-induction. A second circuit H, constituting the line (one-half of which may consist of the earth) for carrying the result to the different instruments to be acted upon, is provided with a movable terminal I at one end and a fixed terminal J at the other, the latter consisting of a block of any good conducting material, both of which terminals I and J are located between and adapted and arranged to be engaged by the flat spring terminals D E of the local circuit.

As a means for vibrating the movable terminal I in a line of motion corresponding with and so as to make alternate contact with the terminals D E of the local circuit A, I prefer to employ an ordinary telegrapher's key K, or to mount the terminal I on the end of a key corresponding in construction and operation therewith to be operated by hand or otherwise, and, if desired, controlled so as to be normally actuated in one direction by means of a retractile spring L, which latter, however, may be dispensed with or another form of spring employed for holding the terminal I out of engagement with both of the terminals D E in its normal position, according to the uses for which my method is employed. The object sought is to cause electrostatic discharges produced by opening the short circuit K to traverse the line circuit H in alternately opposite directions when the movable contact I is vibrated.

Taking the apparatus in a state of rest, as in Fig. 1, the retractile spring L holds the free end of the lever or key K, to which it is attached, inclined upwardly, depressing the other end and causing the terminal I to make contact with the terminal D of the local circuit, at the same time bending the said terminal D so as to break contact between it and the terminal block J of the line-circuit. At the same time the uncontrolled spring terminal E of the local circuit rests upon and makes contact with the terminal block J. In this state the two circuits are united into one and the discharge caused by the breaking or opening of the short local circuit will traverse the line-circuit in the direction indicated by the arrows. The local circuit might be left normally closed or by a suitable arrangement left open when not in use, so as to save the battery. If, now, we depress the outer end of the key K, the first effect is illustrated in Fig. 2, in which the key is shown in mid-stroke and both terminals D E of the local circuit in contact with the block J, thus short-circuiting the battery and causing the local circuit to become electrostatically charged, the direction of the electric current at this time in the local circuit being illustrated by the arrows in said figure, while the line-circuit H is cut out. While the short local circuit A is closed, as illustrated in this figure, the helix thereof becomes electrostatically saturated to a very high degree, the numerous coils thereof, as is well known, producing a mutual inductive reaction on each other, which becomes stored therein, and when the local circuit is again opened will transform the quantity current of the local circuit into pulsations of high electro-motive force capable of traversing a long line of high resistance and operating electrical devices therein when the primary or quantity current of the local circuit alone could not possibly produce this result.

In Fig. 3 the key K is shown depressed to its limit, having first allowed the terminal D of the local circuit to make contact with the terminal J of the line-circuit and then lifted the terminal E of the local circuit out of contact with the terminal J of the line-circuit and also broken contact between the terminal I carried thereby and the terminal D, with which it was originally in contact. Thus the line-circuit is again introduced into the local circuit, uniting both in a single circuit, and at the same time breaking the short local circuit, thereby causing the resulting electrostatic discharge from the local circuit to traverse the line-circuit in the opposite direction from that shown in Fig. 1, as indicated by the arrows. Now, allowing the key to rest at mid-stroke, the local circuit is again closed and the battery short-circuited for an infinitesimally short length of time, but sufficient for it to become electrostatically charged, after which the continued movement of the key restores the parts to the position first described, and shown in Fig. 1, when the short circuit is again broken, the line-circuit again introduced into the local circuit, and the direction of the current again reversed, as indicated by the arrows in said figure. Thus it will be seen that at each complete stroke of the key the line-circuit is twice introduced into the local circuit, the local circuit is twice closed and opened, and the direction of the current through the line is twice reversed, flowing in one direction when the parts are in the position shown in Fig. 1 at one end of the stroke, and in the opposite direction when the parts are in the position shown in Fig. 3 at the opposite end of the stroke, as clearly illustrated by the arrows in the drawings.

The direction of the current indicated by the arrows in Fig. 2, at which time the local circuit is closed, is reversed to the direction indicated when the line-circuit is introduced—that is, toward the battery on the plus side and away from it on the minus side, which is the natural flow of the electric current; but as the discharge which takes place when the line-circuits are cut in is virtually a reaction of the local current it traverses the local circuit in the opposite direction regardless with which of the terminals D or E of the local circuit the key makes contact, the reversal of the discharge through the line being effected solely by the reversal of contact of the terminal I with the terminals D E of the local circuit, and the closing of the local circuit by contact of the terminals D and E with the fixed terminal J of the line-circuit.

It will be observed that the local primary current is never employed directly in the line-circuit, but only the static discharge resulting from the breaking of the short circuit thereof; neither is it used as in the primary of an induction-coil for generating effects in an independent or secondary coil; but the results obtained are due solely to self-induced electrostatic effects in the local circuit itself.

To secure efficiency in the maximum degree, a suitable proportion must exist between the resistance of the battery and that of the helix E, and the wire of the helix be of a size to allow of a great number of turns, in order to secure to the utmost their mutual inductive reaction on each other. Short-circuiting or closing the local circuit A between each discharge is also indispensable, in order that complete electrostatic saturation of the same may be effected after each discharge. The effects may be intensified and strengthened by electro-magnetic induction if a soft-iron core be inserted in the helix, although this is not necessary to its successful operation and should not be employed where extremely rapid vibrations of the key are required, on account of the comparatively slow action of magnetism in iron.

Into the line-circuit may be introduced any suitable number and forms of apparatus capable of being actuated by the alternating currents for producing any desired result; but as neither the form of such apparatus nor the uses to which the alternating currents may be put form a part of this invention I have not deemed it necessary to illustrate any such uses herein, the sole purpose and object of this invention being the method of producing alternating currents by means of electrostatic discharges regardless of the apparatus employed in such production or the apparatus by means of which these currents are utilized.

I am aware that prior to this invention alternating currents have been produced by reversing the terminal contacts of a battery with respect to the terminals of the circuit in which the alternations are to take effect; but this method is objectionable for the reasons before stated and the retardations which occur therein in reversing, which are caused by induction, are the result of a natural phenomena and not of a direct purpose to produce them, and for that reason numerous devices have been employed for destroying such inductive effects, while with my invention the direct purpose is to produce and utilize these heretofore useless and detrimental discharges, to produce an alternating current for the operation of mechanical appliances, and with a weak battery to traverse a long line of high resistance and do effective work therein where the same battery as ordinarily used would be practically useless.

I am not aware that self-induced electrostatic forces have been heretofore produced as herein described, or made capable of direct utilization or used for transforming a feeble current into pulsations of high electro-motive force, and I therefore do not limit myself to the particular mechanical arrangement herein described, as obviously various modifications of and additions to such devices may be employed and produce the same results.

Having described my invention, what I claim, and desire to secure by Letters Patent, is—

The herein-described method of producing alternating electric currents in a line-circuit, the same consisting in first closing a local-battery circuit in which is included a helix, thereby causing the helix to become electrostatically saturated, and then simultaneously opening the local circuit and introducing the line circuit therein, alternately reversing the terminals of the local with the terminals of the line-circuit after each closing of the local circuit, whereby the electrostatic discharge from the helix will traverse the line-circuit in alternately opposite directions, substantially as described.

MAHLON S. CONLY.

Witnesses:
R. C. OMOHUNDRO,
W. R. OMOHUNDRO.